United States Patent [19]
Kleppe

[11] Patent Number: 5,392,645
[45] Date of Patent: Feb. 28, 1995

[54] METHOD AND APPARATUS FOR FLOW RATE MEASUREMENT

[75] Inventor: John A. Kleppe, Reno, Nev.

[73] Assignee: Scientific Engineering Instruments, Inc., Sparks, Nev.

[21] Appl. No.: 152,763

[22] Filed: Nov. 15, 1993

[51] Int. Cl.$^6$ .................... G01F 7/00; G01F 1/66
[52] U.S. Cl. .................... 73/195; 73/861.28; 364/510
[58] Field of Search ........... 73/861, 861.27, 861.28, 73/861.31, 195, 861.65, 861.66; 364/510

[56] References Cited

U.S. PATENT DOCUMENTS

3,564,912 2/1971 Malone et al. .............. 73/861.31
4,162,630 7/1979 Johnson .................... 73/861.27
4,317,178 2/1982 Head .................... 73/861.31 X

*Primary Examiner*—Herbert Goldstein
*Attorney, Agent, or Firm*—Graham & James

[57] ABSTRACT

The average volumetric velocity $\overline{U}_m$ of a fluid flowing within a large industrial flue stack is determined by a combination of measurement and calculation techniques. The temperature, velocity head and static pressure of the stack fluid are measured at two points within the bounded path of the flue stack. The flight time of a random acoustic noise wave is measured in both the upstream and downstream directions. The path average velocity $\overline{U}_p$ is determined from the measured values of the upstream and downstream flight times. The fluid velocity is determined using the measured values of the flight times, the fluid temperature, velocity head and static fluid pressure. The determined values of the path average velocity $\overline{U}_p$ and the fluid velocities are used to determine the average volumetric velocity $\overline{U}_m$. A curve fitting algorithm is employed to determine an approximation of the actual fluid flow distribution across the bounded path, and this approximation is used to calculate $\overline{U}_m$. The average moisture content contained in the flue stack volume is also determined by adding additional sensors to measure the values for oxygen and carbon dioxide, and using these measured values along with the measured values of the flight times and temperature.

22 Claims, 4 Drawing Sheets

METHOD AND APPARATUS FOR FLOW RATE MEASUREMENT

BACKGROUND OF THE INVENTION

This invention relates to methods and systems for continuously monitoring emissions of fluids, particularly gases, in flue stacks and other ducts found in industrial plants and electric utility power generating Stations, and other industrial installations.

With the increasing concern and attention directed to the nature and quantity of industrial emissions, the need has arisen for more accurate techniques for measuring emissions from flue stacks and ducts. One of the major driving forces in this current interest in measuring emissions is the development of strict regulatory procedures at several governmental levels setting minimum standards for acceptable operation of a utilities plant and other industrial plant operations, and providing heavy penalties and other sanctions for violating these standards. One of the major problems encountered in the implementation of the emission standard programs is the lack of proven and reliable systems for measuring the actual values of certain key parameters. While theoretical and pilot systems have been developed to measure many of the key parameters, the implementation of these systems has been found to be very difficult given the extremely hostile environment of industrial flue stacks.

One of the key parameters whose measurement with relative precision is required for reliable continuous emission monitoring is the flue gas volumetric flow rate. In the past, attempts to design and implement measuring systems for determining the volumetric flow rate in industrial stacks have focused on three different types of measuring techniques: thermal dispersion, differential pressure sensors, and ultrasonic sound generators. The thermal dispersion technique employs sensors using "hot wire" or "hot film" cooling to provide an electrical signal representative of fluid temperature. The principle of operation of these devices is based on the phenomenon that fluids passing a heated sensor cool the sensor at a rate proportional to the fluid velocity. In operation, the sensor is inserted into the gas flow path and heated to a constant temperature higher than the temperature of the gas flow being measured. The electrical power required to maintain constant temperature in the velocity sensor is in part proportional to the convective cooling effects of the measured gas flow, which permits the actual velocity to be inferred. Sensors of this type suffer from the disadvantage of becoming readily contaminated with materials present in the gas stream, which requires frequent maintenance in order to maintain the sensors reasonably accurate. Also, the presence of moisture in the gases flowing past the sensor also corrupts the accuracy of the measurement, since most fluids remove sensor heat at a rate which is dependent more on the percentage of moisture in the fluid than on the rate of flow of the fluid.

Differential pressure sensors operate by extracting flow rate data from flowing fluids as a differential relationship between the upstream and downstream pressures. The typical differential pressure sensor employs one or more pitot tubes or a device known as an annubar. These sensors suffer from the disadvantage of requiring bulky, cumbersome arrays of primary measuring instruments which are subject to plugging due to particle contaminants in the gas flow. In addition, the calibration of such devices to the required accuracy is, at best, difficult to achieve and maintain.

Ultrasonic systems use the flight time of sonic pulses between two locations along the bounded fluid path of the flue stack to determine the path average velocity of the gaseous medium $\overline{U}_p$. This technique suffers from the disadvantage that the path average velocity of the gaseous medium $\overline{U}_p$ is only an approximation of the actual average volumetric flow rate $\overline{U}_m$ and only accurately indicates $\overline{U}_m$ when the velocity profile is uniform over the entire cross-section of the stack. However, due to the effects of viscosity in the regions adjacent the stack walls, the velocity profile is never uniform over the entire cross-section, and thus the sonic measurement technique is inherently inaccurate. It can be shown that an ideal, fully developed turbulent flow in a circular stack that varies approximately in accordance with Prandtl's law, which corresponds to a nearly plug flow condition, results in an error of 7 percent in computing $\overline{U}_m$ using the known sonic technique. In addition to this inherent inaccuracy, the ultrasonic technique suffers from additional disadvantages. For example, in order to improve the signal to noise ratio between the transceivers required in the ultrasonic system, the transceivers must face each other at an angle to the stack wall. As a result, the lower (upstream) transceiver is exposed to both moisture and contaminants that run down the stack wall and enter the transceiver unit. While a purge air system can be used to reduce the exposure of the lower transducer to moisture and contaminants, care must be taken to insure that the introduction of this extra flow of air into the duct system does not affect the operation or sensitivity of the transceivers. Further, the ultrasonic approach is also limited by the requirement that the instrument be located far enough from the duct inlet so that the velocity profile may be assumed to be essentially symmetric and well developed (i.e., relatively non-turbulent). In practice, this usually requires that the sensors be located at a distance of at least 20 to 25 stack diameters from the flow inlet, which creates installation and maintenance problems. Efforts to eliminate or substantially reduce the drawbacks noted above in the thermal, differential pressure and acoustic ultrasonic systems have not met with success to date.

SUMMARY OF THE INVENTION

The invention comprises a method and apparatus for providing an accurate determination of the average volumetric flow rate of a fluid flowing along a bounded path which is highly accurate, relatively simple to implement in existing stack installations and provides relatively long periods of reliable operation.

From a method standpoint, the invention comprises a process for determining the average volumetric velocity $\overline{U}_m$ of the fluid flowing along a bounded path, the process including the steps of measuring the flight time t1 of an acoustic noise wave in a first direction between first and second locations along the bounded path; measuring the flight time t2 of an acoustic noise wave in the opposite direction between the first and second locations along the bounded path; using the measured values of the flight time t1 and t2 to determine the path average velocity $\overline{U}_p$ of the fluid; measuring the fluid temperature, velocity head and static fluid pressure at third and fourth locations along the path; using the measured values of the flight times t1 and t2, the fluid temperature, velocity head and static fluid pressure to determine the fluid velocity at the third and fourth locations; and using the determined values of the path average velocity $\overline{U}_p$ and the fluid velocity at the third and fourth locations to determine the average volumetric velocity $\overline{U}_m$ of the fluid. The steps of measuring the flight times t1 and t2 include the steps of generating a relatively low frequency sound wave having principal frequency components below about 10 khz at the first location, detecting the sound wave arriving at the second location, generating a relatively low frequency sound wave at the second location, and sensing the sound wave arriving at the first location; and performing an impulse response calculation on the detected sound waves arriving at the first and second locations. The step of using the determined values of the path average velocity $\overline{U}_p$ and the fluid velocity at the third and fourth locations to determine the average volumetric velocity $\overline{U}_m$ of the fluid is performed by using an appropriate curve fitting algorithm to determine an approximation of the actual flow distribution across the path, and using the approximation to calculate $\overline{U}_m$.

The first and second locations along the bounded path between which the flight times t1 and t2 are measured are preferably adjacent the boundary walls of the path, while the third and fourth locations are preferably positioned intermediate the boundary walls within the confines of the stack boundaries. The method can be expanded by adding more locations, e.g., across the stack diameter, to provide multiple flight path time measurements and multiple point locations at which the actual velocity can be determined from the temperature, velocity head and static pressure measurements.

From an apparatus standpoint, the invention comprises a data gathering apparatus for enabling determination of the average volumetric velocity $\overline{U}_m$ of a fluid flowing along a bounded flow path, the apparatus broadly comprising means for generating an acoustic noise wave at a first location along the bounded path, means for generating an electrical signal representative of an acoustic noise wave at a second location along the bounded flow path; means for generating an electrical signal representative of the temperature of fluid flowing past the second location; means for generating an electrical signal representative of the velocity head of a fluid flowing past the second location; means for generating an electrical signal representative of the static fluid pressure at the second location; and means for supplying the electrical signals to an information processor capable of computing the average volumetric velocity $\overline{U}_m$ from the electrical signals supplied. The acoustic noise wave generating means preferably comprises a pneumatic sound generator operated by compressed air supplied from an already present source in the plant location. The means for generating an electrical signal representative of an acoustic noise wave at a second location preferably comprises a piezoelectric transducer and an amplifier coupled to the output of the piezoelectric transducer. The means for generating an electrical signal representative of the temperature of fluid preferably includes a thermal sensor, while the means for generating an electrical signal representative of the velocity head preferably includes a pitot tube and a pressure transducer coupled to the pitot tube. The means for generating an electrical signal representative of the static pressure includes a static pressure port and a pressure transducer coupled to the static pressure port.

A fluid filter and valve are preferably coupled between the pitot tube and associated transducer, and a fluid filter and valve are preferably coupled between the static pressure port and the transducer, both valves and filters functioning to prevent contaminant particles from entering the transducers, and the valve functioning to permit compressed air purging of the pitot tube and the static pressure port as a periodic maintenance feature. A valve control means is coupled to these aforementioned valves as well as to a plurality of purge valves coupled between a source of compressed air and the pitot tube lines and the static pressure port.

The data gathering apparatus is installed in a duct at a first boundary location along the bounded flow path, with the active portions of the noise wave generating means and the electrical signal generating means being positioned within the fluid flow path. The data gathering apparatus is essentially modular in concept. Thus, a second data gathering apparatus essentially identical to the first is installed in the duct at a second boundary location with portions of the acoustic noise wave generating means and the electrical signal generating means positioned within the bounded flow path either upstream or downstream from the first data gathering apparatus. Each data gathering apparatus is coupled to a data processing unit for converting the electrical signals into the required intermediate values of the path average velocity $\overline{U}_p$, and the actual velocities at the third and fourth path locations, from which the average volumetric velocity $\overline{U}_m$ is finally computed.

Each of the active elements of the data gathering apparatus which are located within the fluid flow path are supported by means attached to the boundary walls of the duct.

For a fuller understanding of the nature and advantages of the invention, reference should be had to the ensuing detailed description taken in conjunction with the accompanying drawings.

DESCRIPTION OF THE PREFERRED EMBODIMENTS

Figure 1:
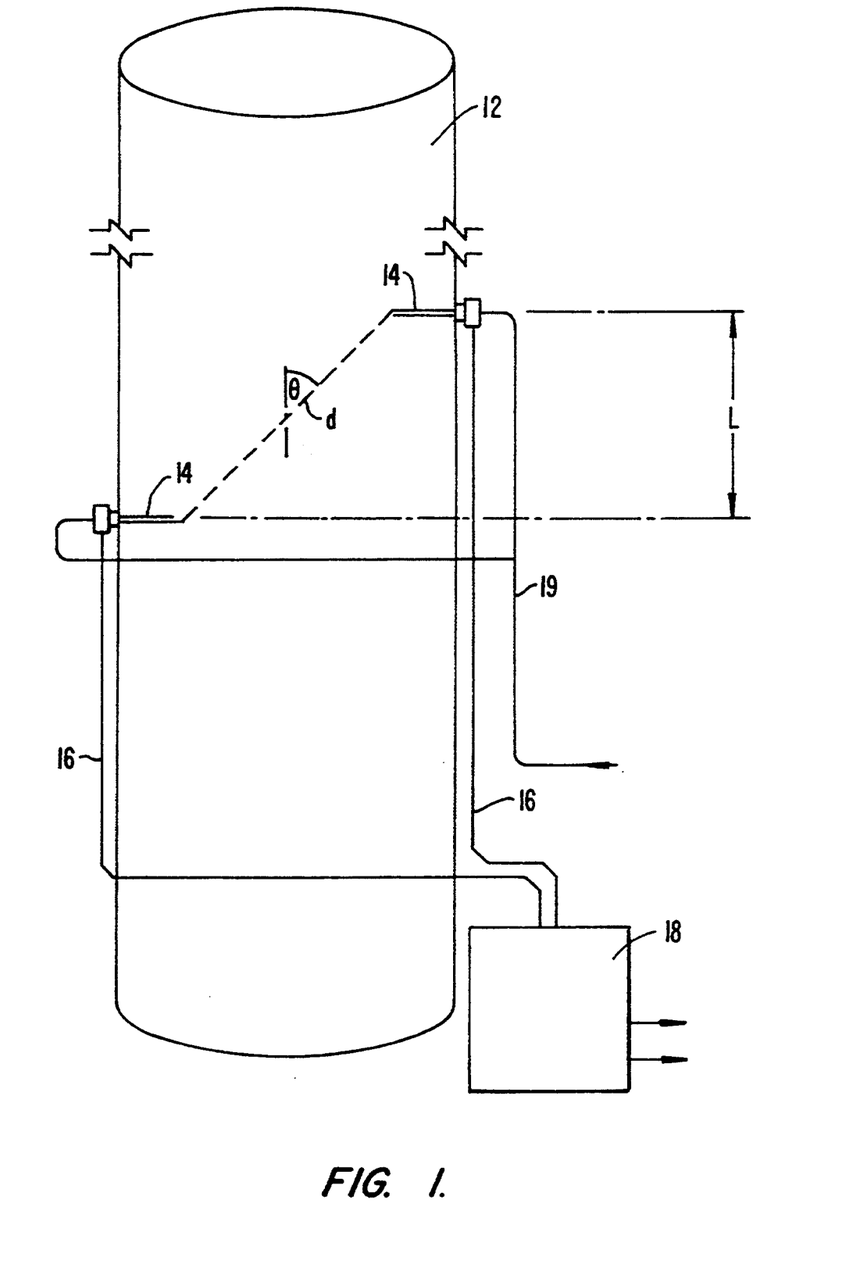
FIG. 1 is a schematic diagram illustrating the preferred embodiment of the invention.

Turning now to the drawings, FIG. 1 illustrates the embodiment of the invention in schematic form. As seen in this figure, a duct 12 defining a bounded fluid flow path is provided with a pair of data gathering assemblies generally designated with reference numerals 14. The duct 12 is typically a large flue stack of the type found in industrial boilers, chemical plants, utilities plants and the like. The two data gathering assemblies 14 are shown mounted at diametrically opposite locations in the duct 12, with one of the assemblies 14 mounted downstream from the other by a distance L. The distance L is preferably about one stack diameter in magnitude. As more fully described below, each assembly 14 is provided with an acoustic sound generating device and a transducer for sensing the wave generated by the generator. The linear separation distance between these two transducers is designated with the reference character d, while the angle between the direct path extending between the two transducers and a vertical reference line (i.e., the vertical axis of the stack 12) is denoted by the reference character Θ.

Assemblies 14 include electrical devices and pneumatic devices. The electrical devices are coupled by multiconductor cable 16 to a signal controller and processor generally designated with reference numeral 18; while the pneumatic devices are coupled by means of conventional compressed air lines 19 to a source of plant compressed air (not shown).

Figure 2:
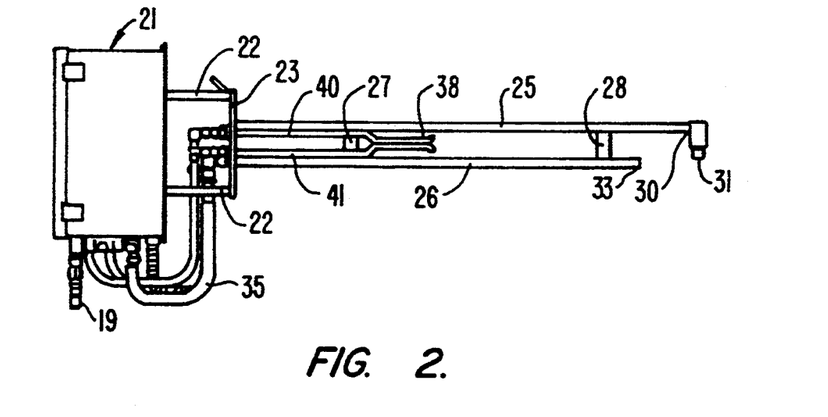
FIG. 2 is a side elevational view illustrating the data gathering apparatus.
Figure 3:
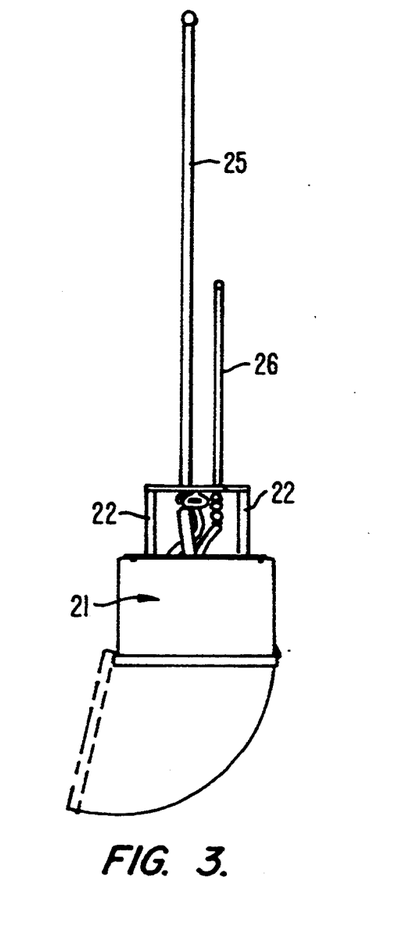
FIG. 3 is a top plan view of the apparatus of FIG. 2.
Figure 4:
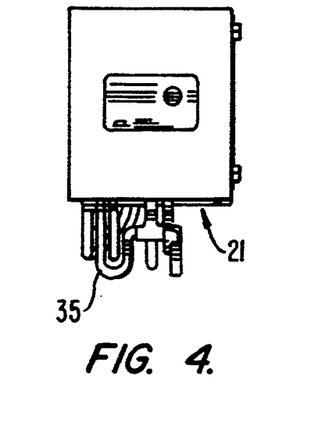
FIG. 4 is an end view taken from the left of FIG. 2.

With reference to FIGS. 2–4, each assembly 14 includes a protective enclosure 21 for housing the electrical and mechanical components described below. Extending from the face of enclosure 21 facing the stack is a support assembly comprising a plurality of stand-off members 22 to which a support plate 23 is connected by suitable fasteners. Attached to support plate 23 are a pair of suspension booms 25, 26 connected along the lengths thereof by support braces 27, 28. Attached to the outer end of upper boom 25 is an assembly which includes a temperature sensor 30 and a piezoelectric transducer 31. The temperature sensor 30 is preferably an RTD-type thermal sensor operable over a temperature measurement range of 0° F. to +395° F. with a resolution of 2° F. and an accuracy of ±2° F. The transducer 31 preferably comprises a type 001004 transducer available from Scientific Engineering Instruments, Inc. of Sparks, Nev. (SEI).

The lower boom 26 is a hollow tube having an open outer end 33 which serves as the source of a random noise acoustical wave generated by applying compressed air to the inlet side of boom 26 adjacent support plate 23 via a compressed air conduit 35 connected via the valve mechanism described below to the source of plant air through conduit 19.

Positioned intermediate upper and lower booms 25, 26 is a pitot tube generally designated with reference numeral 38 and having a pair of tubular sections 40, 41 in fluid communication with a pair of transducers described below with reference to FIG. 5. The entire assembly 14 is preferably a type SEI-4110P assembly available from Scientific Engineering Instruments, Inc. of Sparks, Nev.

Figure 5:
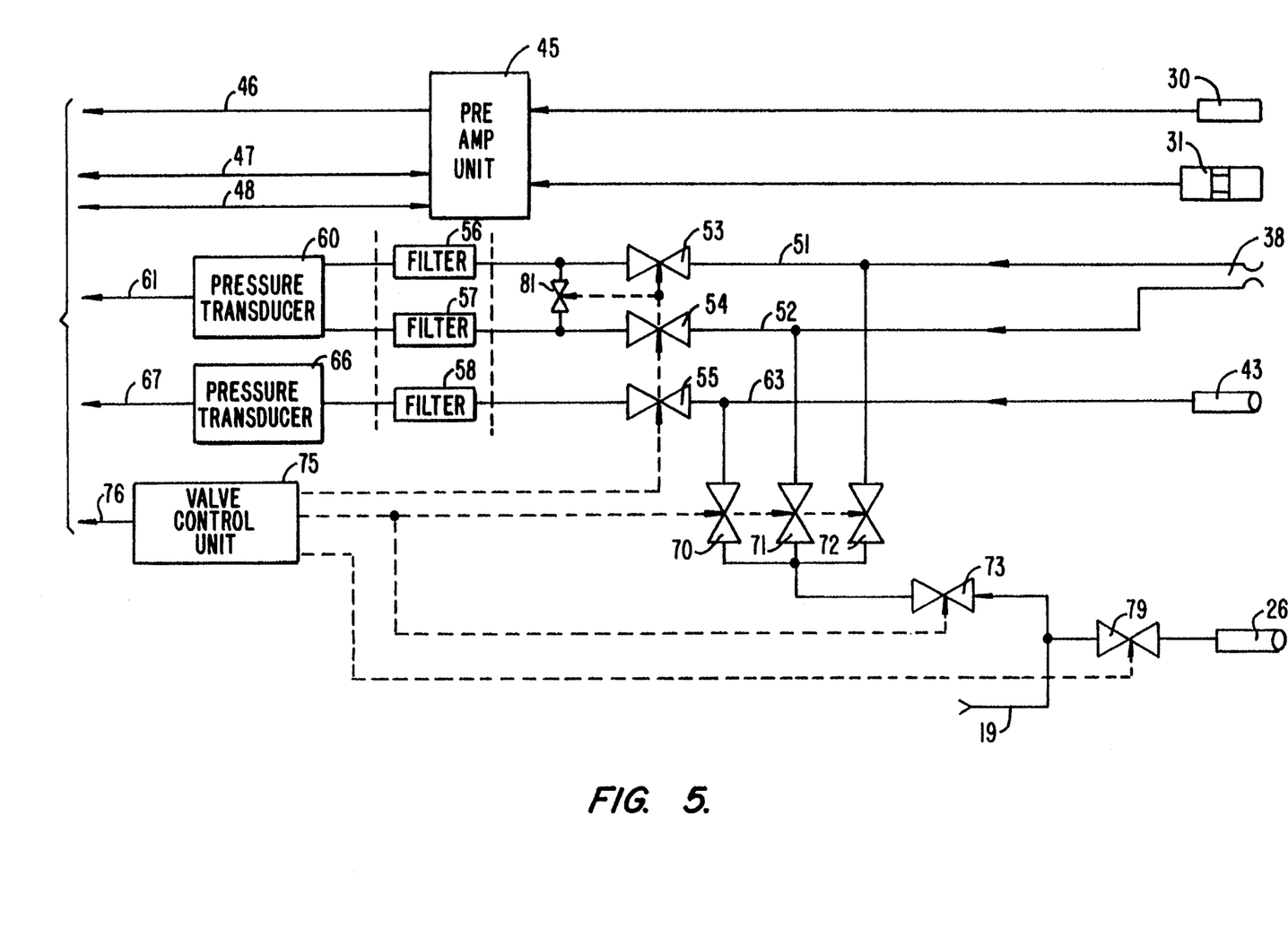
FIG. 5 is a schematic diagram illustrating the data gathering apparatus components.

With reference to FIG. 5, temperature sensor 30 is electrically coupled to a first input of a pre-amplifier unit 45, which amplifies the signal and furnishes the amplified version on output conductor 46 to processor 18. The output of transducer 31 is coupled to a second input of pre-amplifier 45, and the amplified transducer output signal is also coupled to the processor unit 18 along conductor 46. The DC power signals are supplied to pre-amplifier 45 by means of conductors 47, 48. Conductors 46–48 comprise a portion of the multiconductor cable 16 noted above with reference to FIG. 1. The two pitot tube conduits 51, 52 are coupled via electrically activated valves 53, 54 to a pair of filters 56, 57. The outlet of filters 56, 57 is coupled to a dual input pressure transducer 60 which converts the pressure differential to an electrical signal. Transducer 60 is preferably a type 901310 transducer available from SEI. This signal is coupled via output conductor 61 to processor 18. The outlet of static pressure port 43 is coupled via a third electrically actuatable valve 55 to a third filter 58. The outlet of filter 58 is coupled to the input of a pressure transducer 66 which converts the static port pressure to an electrical signal. Transducer 66 is preferably a type 901301 transducer available from SEI. This signal is furnished via conductor 67 to processor 18. Each of the valves 53, 54 and 55 is electrically coupled to a valve control unit 75, which receives control signals from processor unit 18 to control the operation timing for valves 53, 54 and 55. Three purge valves 70–72 are each coupled between a master control valve 73 and the fluid conduits 51, 52 of pitot tube 38 and static pressure port 43. An additional control valve 79 has an outlet coupled to the sound generating lower boom 26. The inlets of master control valve 73 and control valve 79 are coupled to the plant air feeder conduit 19. Valves 70–73 and 79 are likewise controlled by valve control unit 75. Valves 53, 54, 55, 70–73 and 79 are of the normally closed variety, thereby requiring an active control signal from valve control unit 75 in order to change the state of the valve from the normally closed to the open state. An additional isolation valve 81 is coupled between the two inlet conduits to the filters 56, 57 in order to enable zero checking of the transducer 60. Whenever the valves 53, 54 and 55 are opened, the fluid pressures in conduits 51, 52 and 63 are transmitted through to the respective transducer 60, 66 to generate pressure readings. Whenever the valves 70–73 are opened, compressed air from the plant air source is supplied via conduit 19 through the conduits 51, 52 and 63 to force any contaminants out into the interior of the flue stack. Whenever valve 79 is opened, compressed air is supplied via conduit 19 through lower boom 26 to generate a random acoustic noise signal at the end 33 of lower boom 26. The acoustic noise signal generated by this process has principal frequency components which lie below the mid-audio range (i.e., below about 10 Khz). The use of an acoustic noise signal having principal components lying within this frequency range eliminates the focusing requirement found in ultrasonic transducer systems of the type noted above, and therefore eliminates the need for focusing the wave in a beam. Consequently, the construction of the sound generator, as well as the receiving transducers 31, is greatly simplified.

The sequence of operation is as follows. In response to a control signal supplied by processor 18, valve control unit 75 generates a control signal for valve 79 which opens the valve and permits compressed air to flow from conduit 19 through lower boom 26 to generate an acoustic wave. The acoustic wave travels from the outlet end 33 of lower boom 26 through the interior of the stack 12 and is detected by adjacent transducer 31 and converted into an electrical analog signal which is amplified by pre-amplifier 45 and coupled to processor 18. The acoustic wave travelling through the fluid in the stack 12 along the direct path d is detected by the transducer 31 forming part of the other assembly 14. This signal is amplified by amplifier 45 and coupled to the processor 18. After the period of sound generation is over, a control signal from processor 18 signals valve control unit 75 to close the valve 79.

After a predetermined null period, the corresponding elements 75, 79, 19 and 26 are activated in the formerly passive assembly 14, with the result that an acoustic wave is generated in that assembly, detected by the local transducer 31, subsequently detected by the remote transducer 31, and the electrical signals corresponding to the wave are coupled to the processor 18. At the same time, the transducers 30, 60 and 66 generate electrical signals corresponding, respectively, to the stack gas temperature, velocity head of the fluid in the stack and the static pressure within duct 12. These signals are also furnished to processor 18.

From the combination of signals supplied to processor 18, computations are made to determine the path average velocity $\overline{U}_p$, and the actual velocity of the stack fluid at the measuring locations corresponding to transducers 30, and pitot tubes 38. $\overline{U}_p$ is calculated from the following relationship:

$$\overline{U}_p = \frac{d}{2\cos\theta} \left[ \frac{\tau_2 - \tau_1}{\tau_1 \tau_2} \right]$$

where
  d = distance between the transceivers (ft)
  $\Theta$ = angle in degrees shown in FIG. (1)
  $\tau_2$ = flight time of the sound with the gas flow (secs)
  $\tau_2$ = flight time of the sound against the gas flow (secs)

The actual velocity of the stack fluid V at each measuring location is calculated from the following relationship:

$$V = k\sqrt{\Delta P} \sqrt{\frac{T_s}{P_s M_s}}$$

where
  k = pitot tube constant
  $\Delta P$ = velocity head of stack gas
  $T_s$ = stack gas temperature
  $P_s$ = stack gas pressure
  $M_s$ = molecular weight of the stack gas The value of Ms is determined from the flight time and temperature movements by means of the following relationship:
  $T = (d/B_2 \tau)^2 - 460$
  T = gas temperature (° F.)
  d = distance (ft)
  $B_2$ = acoustic constant = $(\tau R/M)^{\frac{1}{2}}$ $$\tau = \frac{2\tau_1 \tau_2}{\tau_1 + \tau_2} = \text{flight-time (secs)}$$

$\tau$ = ratio of specific heats
  R = gas constant (1545 ft-lb/mol-R)
  M = molecular weight (lb/mol)

Rearranging this equation and solving for the acoustic constant B yields:

$$B^2 = \frac{d^2}{\tau^2(T_{oF} + 460)}$$

$$\frac{\gamma_{wg}}{M_{wg}} = \frac{d^2}{R\tau^2(T_{oF} + 460)}$$

Since the value of $\tau$ is nearly constant over the range of temperatures encountered in a flue stack, the value of M is obtained from the measured flight times and temperatures. From these values, a close estimate of the actual velocity profile across the duct 12 is computed using an appropriate curve fitting technique, depending on the shape of the stack.

Figure 6:
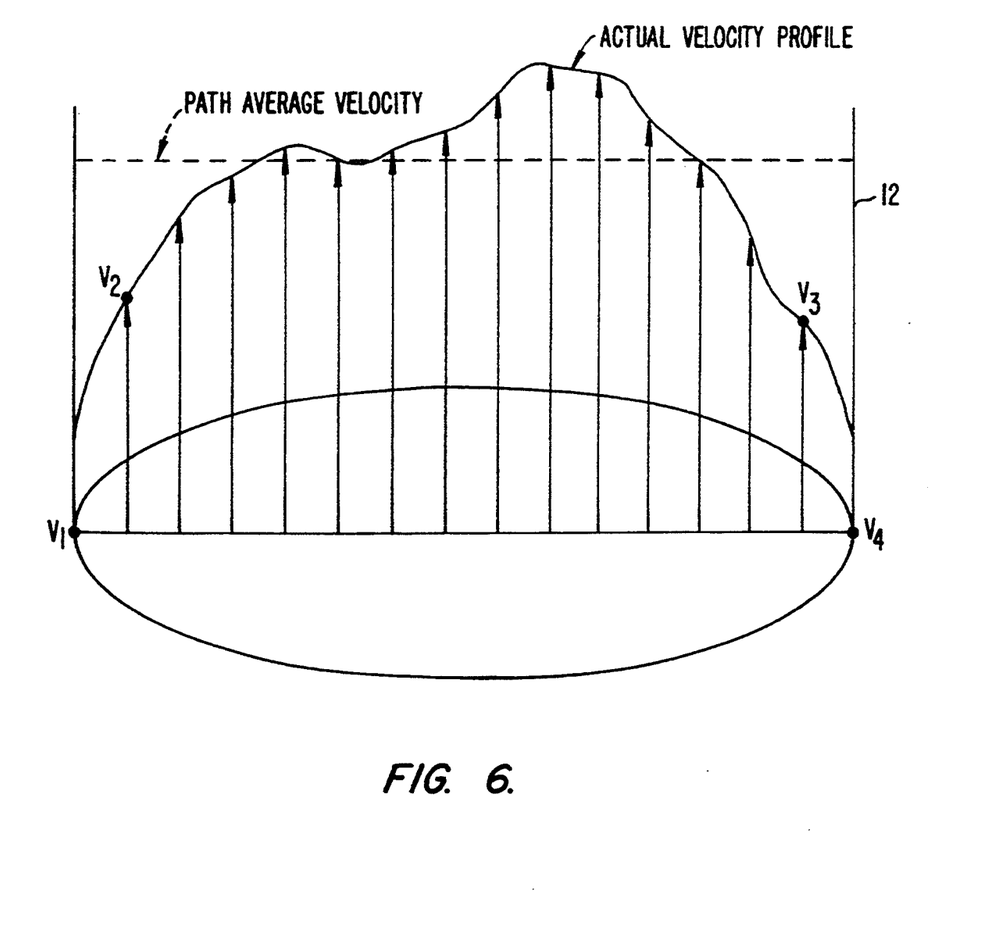
FIG. 6 is a diagramatic view illustrating the principle of the invention.

With reference to FIG. 6, which is a plot of velocity versus distance across a circular stack, the calculated path average velocity $\overline{U}_p$ corresponds to the dotted horizontal line extending between the two boundaries of the stack. The calculated velocities V2 and V3 provide two variable points for the actual velocity profile. From the boundary conditions, it is known that the velocity of the fluid in the stack at the wall boundaries (points V1 and V4) is zero. Knowing the four values of the actual velocity and the path average velocity, it is possible to compute an accurate estimate of the actual velocity profile across the stacked diameter. Since the area below the actual velocity profile curve is equal to the area below the path average velocity, it is possible to employ one of several known curve fitting techniques to provide the estimate of the velocity profile. Lastly, from the estimated velocity profile, the actual average volumetric velocity $\overline{U}_m$ can be computed. The nature of the curve fitting technique employed to provide the estimate of the actual velocity profile depends upon several factors, including the contour of the stack. For circular stacks, the Bezier curve fitting algorithm has been found to provide estimates to within the desired accuracy of ±3%. Other known curve fitting techniques may be employed, as desired. For a further discussion of the Bezier curve fitting algorithm used to generate iso-thermal maps in furnace volumes in utility, refuse and chemical recovery boilers, reference may be had to "Engineering Applications of Acoustics", Artech Press, Boston, Mass., authored by J. A. Kleppe (1989). This reference is hereby incorporated by reference.

While the invention has been described above as having principal utility in providing a calculation of the actual average volumetric flow $\overline{U}_m$ in real time, it should be noted that the invention can be modified and adapted to provide an estimate of the average moisture content contained in the stack volume. In particular, the path average temperature can be calculated in accordance with the equation noted above for T, and the rearranged equation shows that the acoustic flight time varies as a function of the flue gas composition. Thus, by providing additional sensors in the flue stack to measure the values for oxygen and carbon dioxide, the measured values of the acoustic flight time and temperature can be used to calculate an estimated value of the average moisture content over the flight path, and the variation of the acoustic constant B as a funtion of the moisture content can be determined. In one trial, the acoustic measured estimate for the moisture content was found to be 0.043 pounds H2O per pound dry gas, which compares closely to a directly measured value of 0.041 pounds H2O per pound dry gas. Since the average moisture content contained in the stack volume is a parameter of interest in many emissions monitoring applications, the invention provides this additional advantage.

As will now be apparent, the invention provides a relatively simple, efficient and economical technique for providing an actual value of the average volumetric velocity $\overline{U}_m$ of a fluid flowing along a bounded path using conventional transducers and sensors, as well as simple support components. This determination of the average volumetric velocity $\overline{U}_m$ has hitherto been unavailable with such a convenient and relatively uncomplicated system.

While the above provides a full and complete description of the preferred embodiments of the invention, various modifications, alternate constructions and equivalents will be apparent to those skilled in the art. For example, while the invention has been described with reference to a simple two-assembly 14 system mounted on opposite locations in a circular stack, it is understood that additional assemblies 14 may be provided at other peripheral locations of the stack in order to provide additional reference points from which the flight times can be measured and the actual velocities can be calculated. In general, the greater the number of paths and temperature and pressure measurement points, the greater the accuracy of the system and method. In addition, the invention can be employed with stacks having other geometries than the circular geometry disclosed. Therefore, the above described embodiments should not be construed as limiting the scope of the invention, which is defined by the appended claims.

What is claimed is:

1. A method of determining the average volumetric velocity $\overline{U}_m$ of a fluid flowing along a bounded path, said method comprising the steps of:

(a) measuring the flight time t1 of an acoustic noise wave in a first direction between first and second locations along the path;
   (b) measuring the flight time t2 of an acoustic noise wave in the opposite direction between the first and second locations along the path;
   (c) using the measured values of the flight times t1 and t2 to determine the path average velocity $\overline{U}_p$ of the fluid;
   (d) measuring the fluid temperature, velocity head and static fluid pressure at third and fourth locations along the path;
   (e) using the measured values of the flight times t1 and t2, the fluid temperature, velocity head and static fluid pressure to determine the fluid velocity at said third and fourth locations; and
   (f) using the determined values of the path average velocity $\overline{U}_p$ and the fluid velocity at the third and fourth locations to determine the average volumetric velocity $\overline{U}_m$ of the fluid.

2. The method of claim 1 wherein said steps (a) and (b) of measuring the flight times t1 and t2 include the steps of generating a relatively low frequency sound wave at said first location, detecting the sound wave arriving at said second location, generating a relatively low frequency sound wave at said second location, and sensing the sound wave arriving at said first location.

3. The method of claim 2 further including the step of performing an impulse response calculation on the detected sound waves arriving at said first and second locations.

4. The invention of claim 1 wherein said step (f) of using includes the step of employing a curve fitting algorithm to determine an approximation of the actual fluid flow distribution across the bounded path, and using the approximation to calculate $\overline{U}_m$.

5. The method of claim 1 wherein said steps (e) of using includes the step of calculating the molecular weight of the fluid from the measured flight times t1 and t2 and the measured fluid temperature.

6. The method of claim 1 wherein said first location is adjacent a first boundary point on the bounded path, said second location is adjacent a second boundary point on the bounded path, and said third and fourth locations are intermediate the first and second locations.

7. A data gathering apparatus for enabling the determination of the average volumetric velocity $\overline{U}_m$ of a fluid flowing along a bounded flow path, when a pair of said data gathering apparatus are arranged within said bounded flow path, said apparatus comprising:

means for generating an acoustic noise wave at a first location along the bounded path;
   means for generating an electrical signal representative of an acoustic noise wave at a second location along the bounded flow path;
   means for generating an electrical signal representative of the temperature of fluid flowing past the second location;
   means for generating an electrical signal representative of the velocity head of fluid flowing past the second location;
   means for generating an electrical signal representative of the static pressure of fluid at the second location; and
   means for supplying said electrical signals to an information processor capable of computing the average volumetric velocity $\overline{U}_m$ from the electrical signals supplied from a pair of said data gathering apparatus.

8. The apparatus of claim 7 wherein said acoustic noise wave generating means comprises a pneumatic sound generator.

9. The apparatus of claim 7 wherein said means for generating an electrical signal representative of an acoustic noise wave at a second location comprises a piezoelectric transducer.

10. The invention of claim 9 further including an amplifier coupled to said piezoelectric transducer.

11. The apparatus of claim 7 wherein said means for generating an electrical signal representative of the temperature of fluid includes a thermal sensor.

12. The apparatus of claim 7 wherein said means for generating an electrical signal representative of the velocity head includes a pitot tube and a transducer coupled to said pitot tube.

13. The apparatus of claim 7 wherein said means for generating an electrical signal representative of the static pressure includes a static pressure port and a pressure transducer coupled to said static pressure port.

14. The apparatus of claim 12 further including a fluid filter and a valve coupled between said pitot tube and said transducer.

15. The apparatus of claim 13 further including a fluid filter and a valve coupled between said static pressure port and said transducer.

16. The apparatus of claim 14 or 15 further including valve control means for controlling the operation of said valve.

17. The apparatus of claim 16 further including a plurality of purge valves coupled between said valve control means and said pitot tube and said static pressure port.

18. The apparatus of claim 7 wherein said data gathering apparatus is installed in a duct at a first boundary location of said bounded path with a portion of the means for generating an acoustic noise wave and a portion of each of the means for generating an electrical signal positioned within the flow path.

19. The apparatus of claim 18 further including a second data gathering apparatus having elements corresponding to the elements recited in claim 7 installed in said duct at a different location along said bounded path from the first mentioned data gathering apparatus with at least portions of the acoustic noise wave generating means and each of the means for generating an electrical signal positioned within the bounded flow path.

20. The apparatus of claim 19 wherein said second data gathering apparatus is positioned downstream of the bounded flow path from the first mentioned data gathering apparatus.

21. The apparatus of claim 19 wherein each data gathering apparatus is coupled to a data processor unit.

22. The apparatus of claim 7 further including means for supporting the acoustic noise wave generating means and each of the electrical signal generating means within the bounded flow path.

* * * * *

UNITED STATES PATENT AND TRADEMARK OFFICE
CERTIFICATE OF CORRECTION

PATENT NO. : 5,392,645
DATED : February 28, 1995
INVENTOR(S) : John A. Kleppe

It is certified that error appears in the above-indentified patent and that said Letters Patent is hereby corrected as shown below:

In column 1, lines 9 and 10, change "Stations" to --stations--.

In column 7, line 18, change "$\tau_2$" to --$\tau_1$--.

In column 7, line 40, change "$\tau$" to --$\gamma$--.

In column 7, line 45, change "$\tau$" to --$\gamma$--.

In column 7, line 58, change "$\tau$" to --$\gamma$--.

Signed and Sealed this

Eleventh Day of July, 1995

Attest:

BRUCE LEHMAN

Attesting Officer     Commissioner of Patents and Trademarks